United States Patent [19]

Niwa et al.

[11] Patent Number: 5,322,375

[45] Date of Patent: Jun. 21, 1994

[54] TAPE PRINTING DEVICE HAVING AUTOMATIC CHARACTER SIZING

[75] Inventors: Akihiko Niwa, Toki; Hideo Ueno; Shoji Sakuragi, both of Nagoya, all of Japan

[73] Assignee: Brother Kogyo Kabushiki Kaisha, Nagoya, Japan

[21] Appl. No.: 980,708

[22] Filed: Nov. 24, 1992

[30] Foreign Application Priority Data

Jan. 8, 1992 [JP] Japan ............................. 4-019495

[51] Int. Cl.$^5$ .............................................. B41J 5/30
[52] U.S. Cl. ...................................... 400/61; 400/63; 400/76
[58] Field of Search ............... 400/120, 3, 61, 62, 400/63, 76

[56] References Cited

U.S. PATENT DOCUMENTS

| | | | |
|---|---|---|---|
| 4,121,228 | 10/1978 | Cowe et al. | 400/2 |
| 4,644,367 | 2/1987 | Onoda et al. | 400/18 |
| 4,785,391 | 11/1988 | Apley et al. | |
| 4,966,476 | 10/1990 | Kuzuya et al. | |
| 5,066,152 | 11/1991 | Kuzuya et al. | |
| 5,168,814 | 12/1992 | Kuzuya et al. | 400/120 |

FOREIGN PATENT DOCUMENTS 49-129447 12/1974 Japan .
2-106555 4/1990 Japan .

*Primary Examiner*—Edgar S. Burr
*Assistant Examiner*—John S. Hilten
*Attorney, Agent, or Firm*—Oliff & Berridge

[57] ABSTRACT

After an operator inputs text data and presses the print execution key, a console for setting the size of characters appears on the display. Setting auto-mode in this step initiates the process of data examination. If the whole text consists of code data for capital alphabets and numerals, the control unit calculates the magnification power Q for magnifying original characters to maximum characters, and the printing device prints the text in maximum size.

17 Claims, 9 Drawing Sheets

Fig.4B

| START | |
|---|---|
| S410 | INITIALIZE |
| S411 | KEY INPUT? |
| S412 | TEXT COMPOSITION KEY INPUT? |
| S413 | TEXT COMPOSITION |
| S414 | PRINT EXECUTION KEY INPUT? |
| S415 | PRINT EXECUTION |
| S416 | PROCESS CORRESPONDING TO KEY OPERATION |

Fig.5B

| START PRINT EXECUTION | |
|---|---|
| S50 | DISPLAY SIZE-SETTING CONSOLE |
| S51 | SIZE-SETTING PROCESS |
| S52 | "AUTO" SIZE SELECTED? |
| S53 | CALCULATE Q GIVING SET SIZE |
| S54 | PP ← TOP ADDRESS |
| S55 | READ DATA |
| S56 | ARRANGE PRINT DATA BASED ON Q |
| S57 | OUTPUT PRINT DATA |
| S58 | PP ← (PP+1) |
| S59 | ANY DATA? |
| S60 | TAPE SENDING AND CUTTING PROCESS |
| S61 | SEARCH TEXT DATA |
| S62 | ONLY CAPITALS AND NUMERALS? |
| S63 | CALCULATE Q GIVING MAXIMUM SIZE Z |
| S64 | CALCULATE Q GIVING SIZE (Z×R) |
| RETURN | |

# TAPE PRINTING DEVICE HAVING AUTOMATIC CHARACTER SIZING

BACKGROUND OF THE INVENTION

1. Field of the Invention

The present invention relates to a tape printing device, and more particularly to a tape printing device having a mode in which the tape printing device automatically prints strings comprising capital alphabets, numerals or symbols in maximum size within the width of the tape print medium.

2. Description of Related Art

Various proposals have been made concerning a tape printing device for printing desired strings on a tape medium of fixed width (e.g. 10 mm or 24 mm). The applicant of present invention has proposed a tape printing device in U.S. Pat. No. 5,066,152 for printing characters and symbols with a thermal head on a print medium after an operator selects letters to be printed by operating a rotatable letter selection dial, and the printed medium formed in the process can be secured to a desired place on an object such as a file.

A tape printing device of this category normally stores dot patterns for characters with accent symbols, capital alphabets, small alphabets or numerals on a character generator ROM. In the above construction, the dot pattern for the characters correspond to the size of letters decided by the Base Line (BL), Top Alignment (TA) and Bottom Alignment (BA) so that the characters are printed within the print allowance area D2 as shown in FIG. 8 of the preferred embodiment of present invention.

Accordingly, when the tape printing device prints characters, especially capital alphabets or numerals, on a tape print medium 5, the tape printing device often leaves a gap G between Base Line BL and Bottom Alignment BA.

Since capital alphabets and numerals of any character size are printed on the print medium with a gap left between Base Line BL and Bottom Alignment BA, the characters and numerals are printed in the print allowance area with the gap. In this way, the characters are printed in a smaller size and the printing device fails to make full use of the print allowance area, despite the capacity of the tape printing device to print characters in the largest size.

SUMMARY OF THE INVENTION

An object of the present invention is to provide a tape printing device capable of printing particular characters or symbols such as capital alphabets or numerals in the largest size on the print allowance area of the tape print medium, thus attaining efficient use of the print medium.

A tape printing device according to the present invention has a printing means including a printing head for printing characters in dot patterns, an input means for inputting characters, numerals and various commands, a data storage means for storing character data and symbol data input from said input means, and a print control means for receiving data stored in the data storage means, generating dot pattern data for characters and driving said printing means to print characters.

The printing device comprises a mode setting means for setting the auto mode in which the printing device prints the characters in maximum size and a means for printing particular characters in maximum size across the width of the print allowance area on a tape medium, when all the characters stored in the data storage means are found to be characters or symbols.

A tape printing device of the present invention stores data of the characters and symbols input from the input means in the data storage means. Meanwhile, when the auto mode is activated by the mode setting means, an examination means decides whether all the characters stored in the data storage means belong to predetermined group of characters. When the examination means finds that all the data belong to the predetermined group of characters, the print control means generates dot patterns in maximum size across the width of the print allowance area of the print medium and drives said printing means to print characters on the medium.

As illustrated above, when all the characters belong to the predetermined group, the printing device with the auto mode active prints characters in maximum size across the width of the print allowance area, leaving no gaps above or under the characters.

Thus, the tape printing device of the present invention having the mode setting means and the print control means prints characters in a maximum size on the condition that the auto mode is activated and all the characters and symbols input for printing are found in the predetermined group of characters. Since the controlling means of the tape printing device has a function of generating dot pattern data corresponding to characters of maximum size across the print allowance area of the tape print medium when the above conditions are met, the tape printing device carries out printing, for example, capital alphabets and numerals in a maximum size, achieving an efficient use of a print medium.

BRIEF DESCRIPTION OF THE DRAWINGS

A preferred embodiment of the present invention will be described in detail with references to the following figures wherein:

FIG. 4B is a table listing the steps of the flowchart of FIG. 4A.

FIG. 5B is a table listing the steps of the flowchart of FIG. 5A.

DETAILED DESCRIPTION OF PREFERRED EMBODIMENTS

Hereinafter, a preferred embodiment of the present invention is described with references to the figures.

The preferred embodiment of the present invention is embodied in a tape printing device capable of printing diverse characters such as alphabets and symbols.

Figure 1:
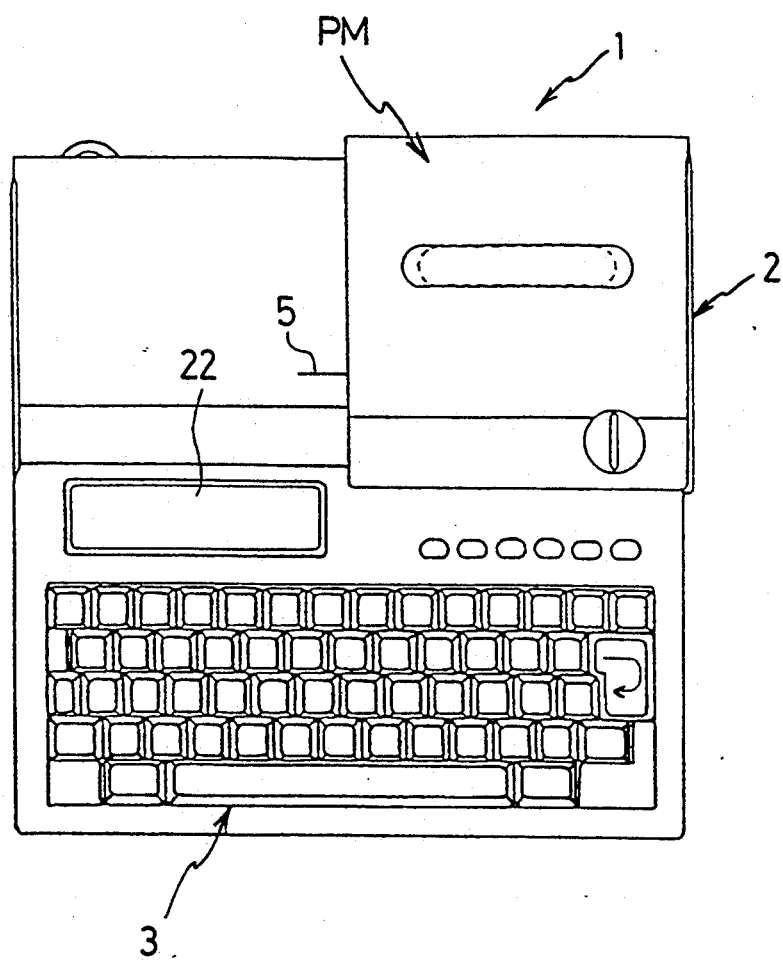
FIG. 1 is a plan view of the tape printing device.

As shown in FIG. 1, a keyboard 3 is provided in the front of main frame 2 of a tape printing device 1, a printing mechanism PM is provided behind the keyboard 3, and a liquid crystal display 22 for displaying characters and symbols is provided behind the keyboard 3.

The keyboard 3 has character keys for inputting alphabets, numerals and symbols, a space key, a return key, a cursor key for sending the cursor right and left, a composition key for composing a text, a print key for initiating a print execution, and a power switch for turning on and off power to the tape printing device.

Figure 2:
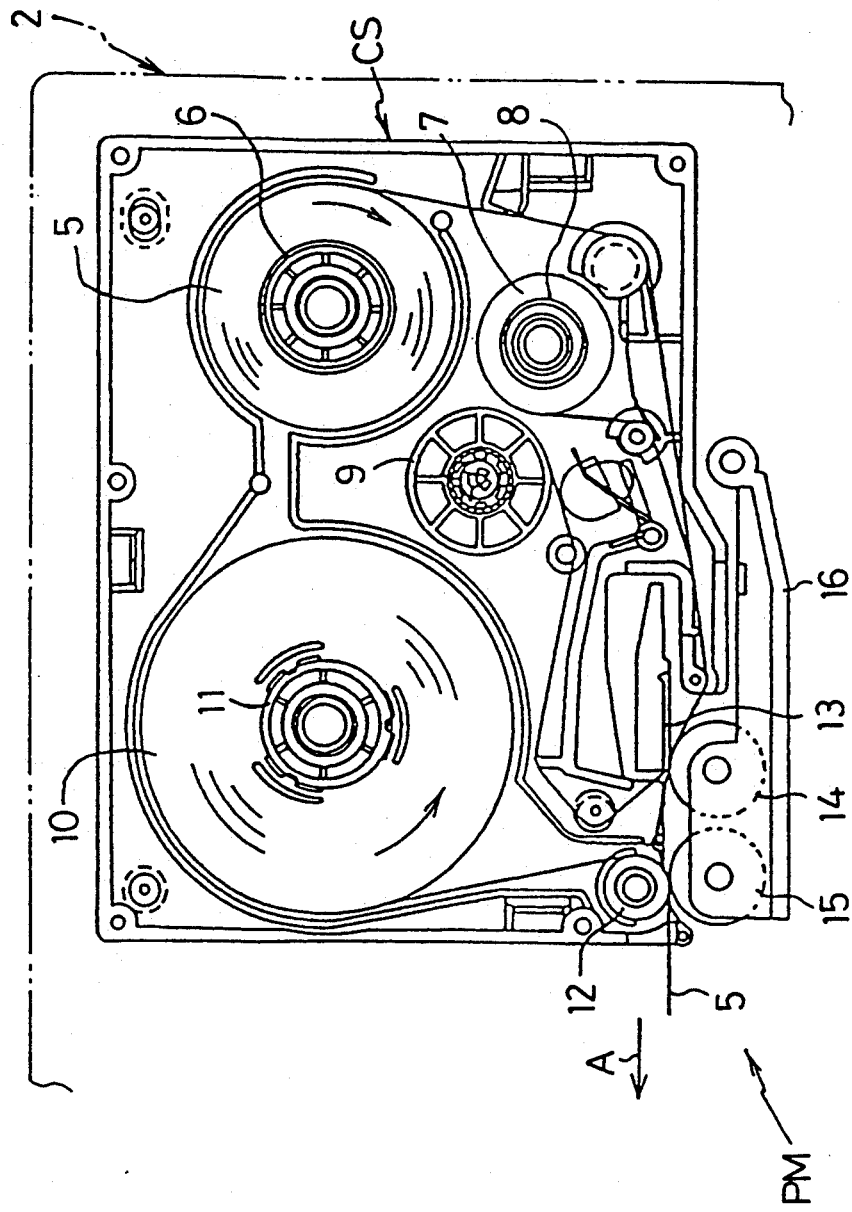
FIG. 2 is a plan view roughly depicting the print mechanism including the tape cassette.

Here is a brief description of the printing mechanism PM. A rectangular-shaped tape cassette CS is detachably loaded in the printing mechanism PM. As shown in FIG. 2, the tape cassette CS has a tape spool 6 to which a tape print medium 5 is wound consisting of a transparent film of about 24 mm wide, a ribbon supply spool 8 to which ink ribbon 7 is wound, a winding up spool 9 for winding up the ink ribbon 7, a supply spool 11 to which a double-sided adhesive tape 10 is wound with its releasable sheet facing outside and a contact roller 12 rotatably provided for keeping the tape print medium 5 and the double-sided adhesive tape 10 in contact.

A thermal head 13 is provided where the tape print medium 5 and the ink ribbon 7 overlap. A platen roller 14 for pressing the tape print medium 5 and the ink ribbon 7 against the thermal head 13 and a sending roller 15 for pressing the tape print medium 5 and the double-sided adhesive tape 10 against the contact roller 12 are rotatably installed in a supporting member 16. The thermal head 13 preferably has an array of 128 thermal units provided vertically.

In the above construction, turning on the thermal units while the tape sending roller 15 drives the contact roller 12 and the winding up spool 9 causes the printing device to print characters in a combination of dot columns. During the process, the tape print medium 5 and the double-sided adhesive tape 10 are kept in contact and sent in direction A. A detailed illustration of the print mechanism PM is given in Japanese unexamined patent publication No. HEI2-106555.

Figure 3:
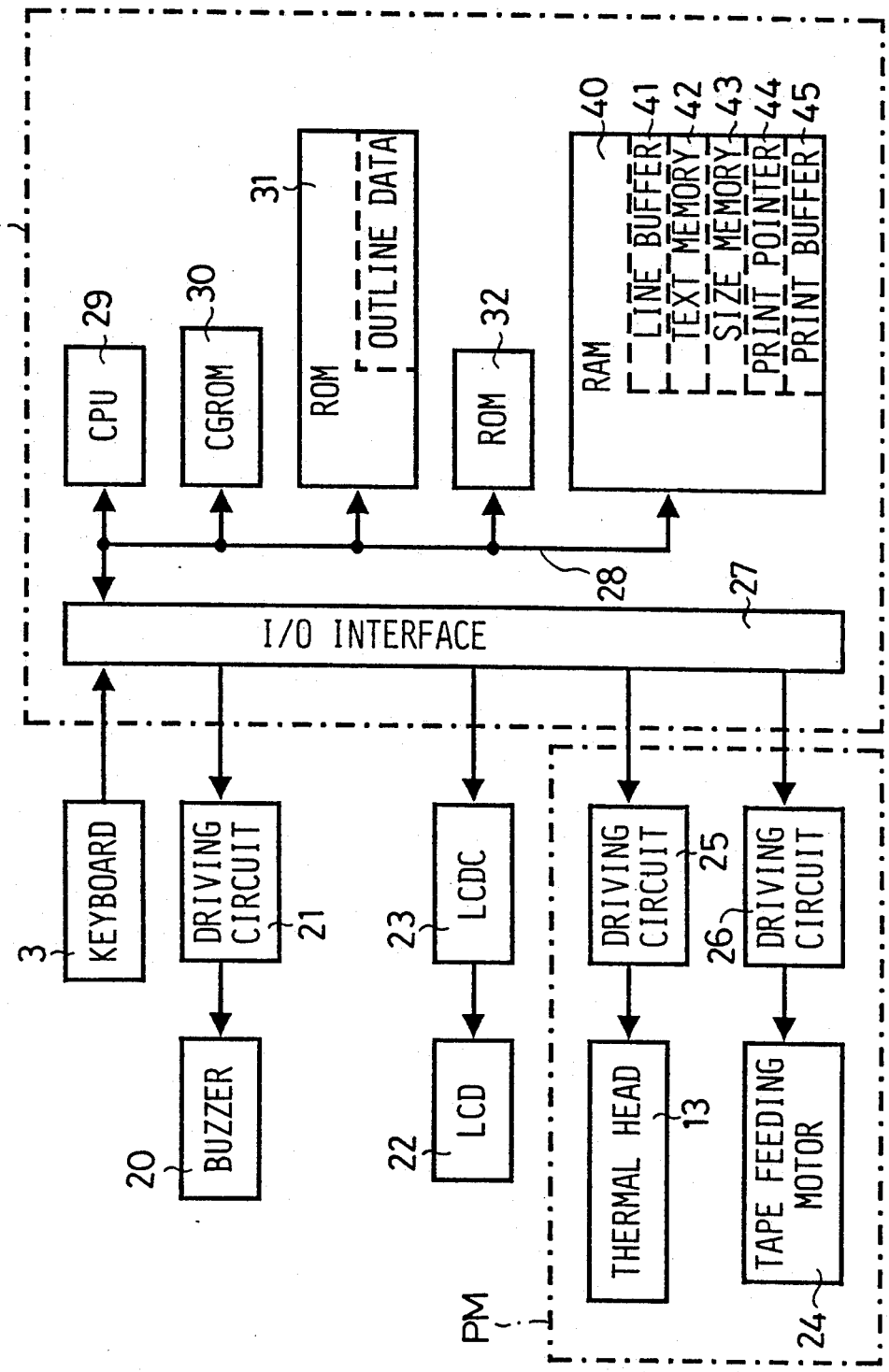
FIG. 3 is a block diagram depicting the control system of the tape printing device.

The controlling system of the tape printing device 1 is constructed as shown in the block diagram FIG. 3.

A keyboard 3, a display controller (LCDC) having a display RAM for storing display data to be transmitted to a liquid crystal display (LCD) 22, a driving circuit 25 for driving the thermal head 13, a driving circuit 26 for driving the tape feeding motor 24 to drive the tape sending roller 15 and a driving circuit 21 for driving an alarm buzzer 20 are connected to an input/output interface 27 respectively. A control unit consists of a CPU 29, the input/output interface 27 connected via bus 28 (including data bus) to the CPU 29, a CGROM 30, a ROM 31, a ROM 32 and a RAM 40.

The CGROM (pattern data memory) 30 stores dot patterns for each one of the characters, and a pattern corresponding to a character code is retrieved by addressing the CGROM with a character code. The ROM 31 (outline data memory) stores outline data contouring each one of the characters, and outline data corresponding to each character code is classified according to the type style (e.g. Gothic) of the character.

Figure 4A:
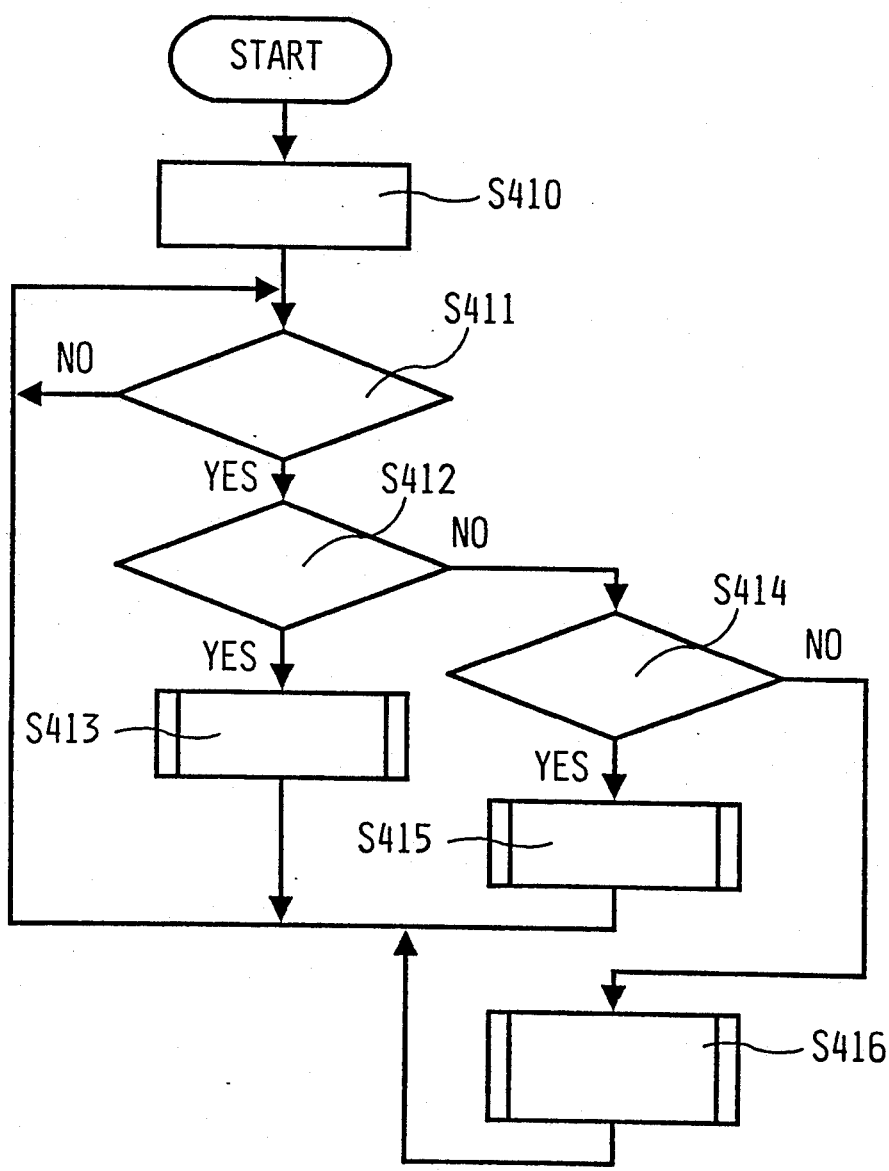
FIG. 4A is a flowchart roughly illustrating the tape print control routine.

The ROM 32 stores a display driver control program for controlling the display controller 23 according to the character, numeric and symbol data input from the keyboard 3, an image generation control program for converting outline data corresponding to each character code stored on the text memory 42 into dot data to be stored on the text memory 42, a print driver control program for driving the tape feeding motor 24 and the thermal head 13 of the print mechanism PM while sequentially receiving data from the print buffer 45 and a control program characteristic of present invention for controlling the tape print control (illustrated in FIGS. 4A and 4B).

A line buffer 41 of the RAM 40 currently holds text data consisting of code data for characters and symbols input from the keyboard 3. The text memory 42 holds text data sent from the line buffer 41. A size memory 43 holds data on the size of characters to be printed. A print pointer (the content of the pointer is referred to as PP) holds an address of a character code stored on the text memory 42 to print a character corresponding to the character. The print buffer 45 stores decoded image data of characters and symbols. The print buffer 45 has a data storage capacity which accommodates 128-dots vertically and a plurality of characters horizontally, and arranges image data converted from print data at proper locations on the buffer. In this embodiment, the text memory 42 has a storage capacity of up to an entire text input by an operator.

A tape print control routine executed by the control unit C of the tape printing device will now be described with reference to flowcharts shown in FIGS. 4A and FIG. 5A. In this control scheme, the size of the characters to be printed is normally determined by a point size input by an operator. However, the tape printing device 1 has an 'auto size' setting, and the tape printing device 1 prints characters in maximum size Z (e.g. about 50 points) across the width of the tape print medium 5 under this setting. In the flowcharts, signs Si (i=10,11,12 . . . ) correspond to individual steps.

Applying power to the tape printing device invokes the tape print control routine and initializes memories 41 to 45 (S410), operating the text composition key in this stage (Yes in S411 and S412) causes the line buffer 41 to store text data input from, for example, character keys, and characters and symbols corresponding to the code data appears on the display 22. Typing the stop key in this stage invokes a text composition process (S413) in which data in the line buffer 41 is stored in the text memory 42, and resumes S411.

Figure 5A:
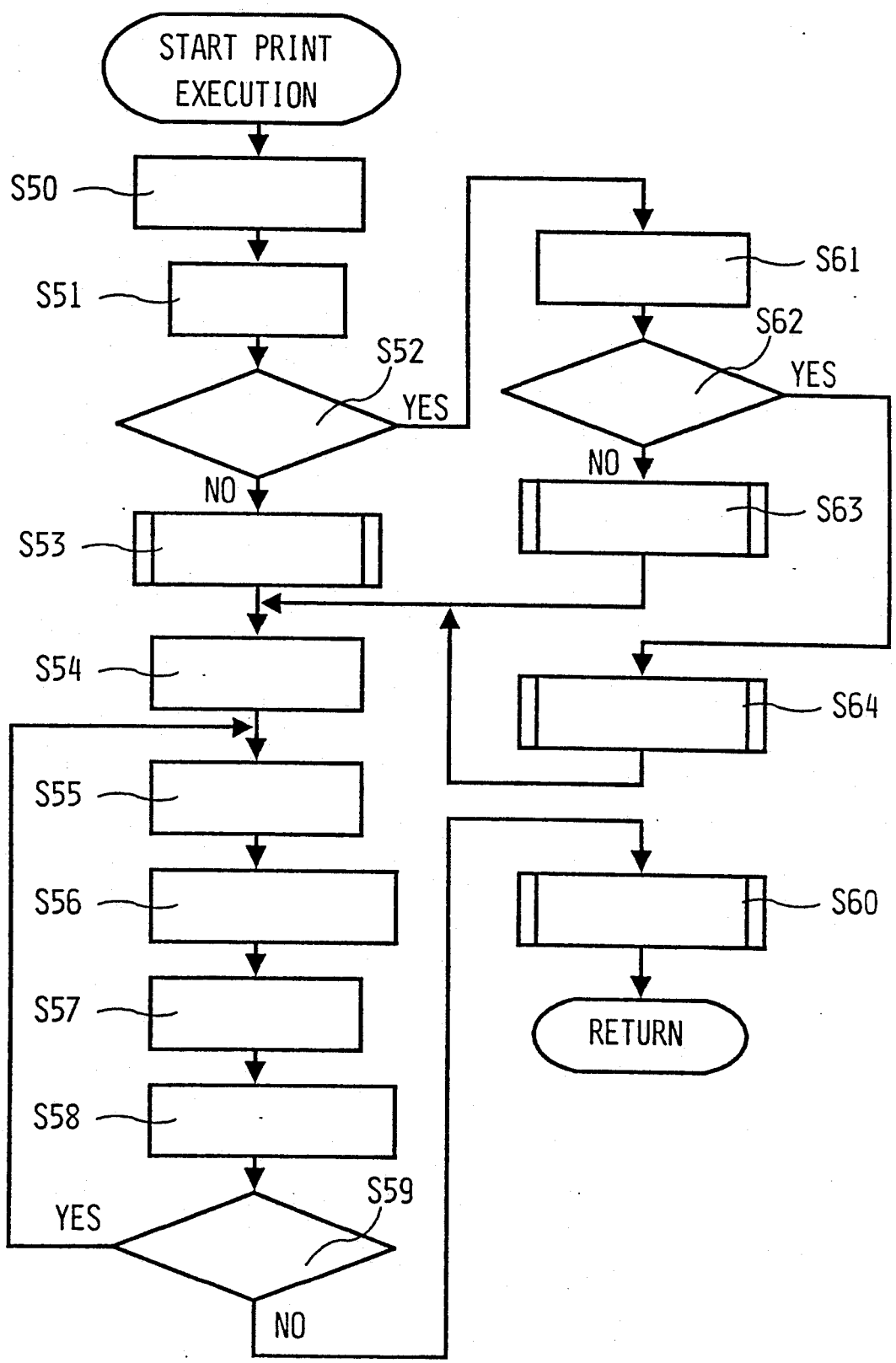
FIG. 5A is a flowchart roughly illustrating the print process control routine.
Figure 6:
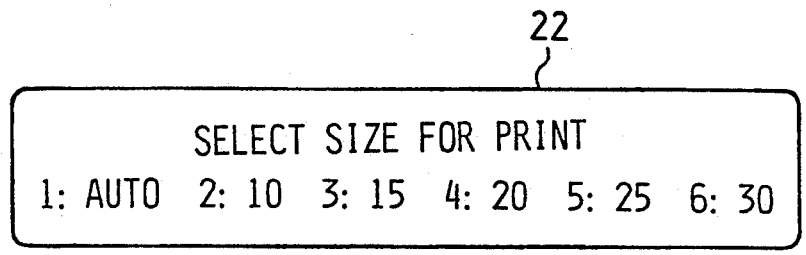
FIG. 6 is a schematic view illustrating a sample console for setting the size of characters.

Operating the print key in this stage (Yes in S411, No in S412 and Yes in S414) invokes the print process control (S415, shown in FIG. 5A). After this control starts, a console for setting the size of characters appears on the display 22 (S50). In this console, a menu carrying selection numbers and sizes of characters (e.g. 1:AUTO, 2:10 points 3:15 points . . . , displayed up to 50 points in this format) appears on the display as shown in FIG. 6. Pressing the cursor-right key sends the size values left in scroll motion.

In the next step, a size setting process is invoked, and typing a number for a particular size in the menu console sets the size of characters (S51) on the size memory 43. If a number for 'AUTO' is selected in this process (Yes in S52), a special code defining the 'auto-size' is stored on the size memory, activating the auto-size mode.

In S52, the size of characters is examined by the size data stored on the size memory 43. If the size data is found to be a data other than for 'AUTO' (No in S52), magnification power Q for generating the image of characters in desired size is calculated (S53). The print pointer loads the top address of the text memory 42 (S54), and the code data addressed by the print pointer value PP is read out (S55).

Outline data is magnified by the power Q calculated in above step and converted into print data in a dot-data format. The print data is stored on the print buffer 45 (S56) and then transmitted to the print mechanism PM for print process (S57). The method for converting outline data into dot data by power Q is disclosed in Japanese unexamined patent publication 49-29447.

Figure 7:
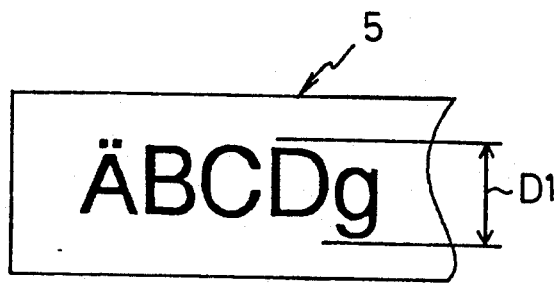
FIG. 7 is a schematic view of printed tape showing characters printed in 40 points.
Figure 8:
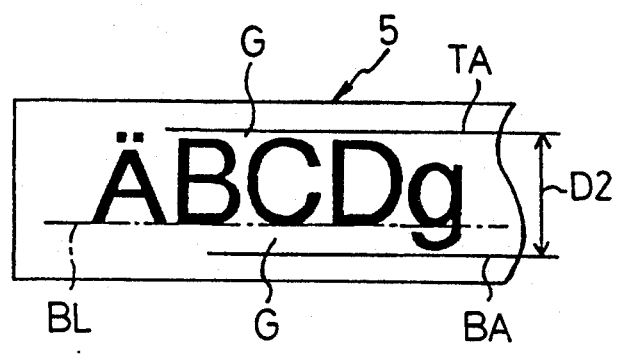
FIG. 8 is a schematic view of a printed tape showing characters printed in 50 points.

Every time S58 is reached, the print pointer value PP is increased by one. If any code data exists in the text memory 42 (Yes in S59), steps from S55 to S59 are iterated. After print process is performed for all the data on the text memory 42 (No in S59), the control unit sends a driving signal to the tape sending roller 24 to send the tape by a predetermined length, a cutting mechanism cuts the tape, and the tape printing device resumes operation in the main routine. Now, for example, if the size of characters is set at 40 points (as shown in FIG. 7), the control unit magnifies the characters by the magnification power Q obtained in above mentioned calculation so that the characters are printed across the width D1 corresponding to the character size 40 points. Accordingly, capital alphabets 'BCD' and a small alphabet 'g' are printed on the tape print medium 5 in 40 points.

On the other hand, the size setting is in 'AUTO', auto-mode is activated (Yes in S52). In this mode, entire text stored on the text memory is examined. If any code data other than for a capital alphabet and for a numeral, for example, a code for small alphabet, exists (No in S62), a magnification power Q which gives maximum character size (e.g. 50 points) on the tape print medium 5 is calculated (S53). Characters magnified by the magnification power Q are printed in steps S54 to S59. If printing process is performed over all the data (No in S59), the control unit resumes operation in the main routine after performing a process in S60. Now, for example, if any code data other than for a capital letter and for a numeral, for example a code data for a small letter, exists with the 'auto-mode' activated, capital letters 'BCD' and a small letter 'g' are so printed in 50 points so that these characters can be printed within the print allowance area D2.

Figure 9:
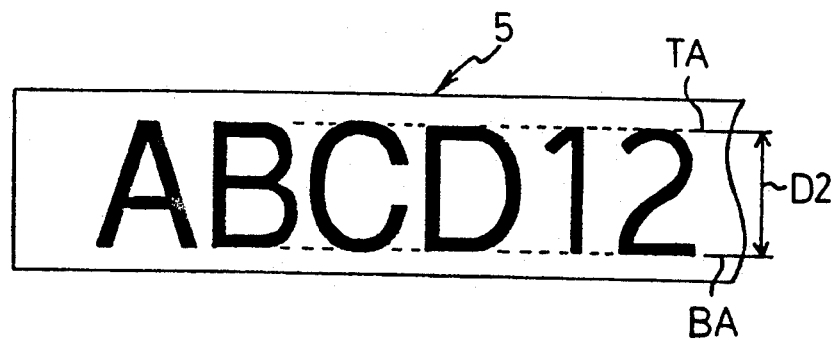
FIG. 9 is a schematic view of a printed tape showing selected characters printed in maximum size.

Meanwhile, if the auto-mode is activated and all the code data on the text memory 42 are either for capital letters or for numerals (Yes in S52, S61 and S62), the magnification power Q is so calculated that the value Q gives the character size of Z multiplied by R (R >= 1) (S64), the control unit C performs processes in S54 to S59 until it processes all the code data stored on the text memory 42 (No in S59) and resumes operation in the main routine. As shown in FIG. 9, for example, if all the code data on the text memory is either for capital letters or numerals and the character size is set to be 'AUTO', the control unit sets the value R, for example, at 1.3, so that the printing device prints the capital alphabets 'ABCD' and numerals '1,2' in 65 points across the width of the print allowance area on the tape. In this case, these letters are printed across the width of the print allowance area D2 without leaving any gap between characters and either top alignment TA or bottom alignment BA.

As described above, if only predetermined characters (e.g. capital alphabets or numerals) are input under the auto-mode, the tape printing device generates dot pattern data for printing maximum characters across the width of the print allowance area D2, achieving efficient use of the print allowance area of the tape print medium 5.

In this embodiment, a tape medium of 24-mm wide is used. However, the tape printing device may be so constructed that it can select a tape medium of particular width out of tape mediums of various widths (e.g. 18 mm, 12 mm, 6 mm). Furthermore, the tape printing device has a function of detecting the type of tape medium, and the variable R may have any value greater than or equals to 1.0. The tape printing device can also be constructed so that it can handle a logo or various marks as substitutions to the predetermined letters to be printed across the print allowance area. The tape printing device which prints letters on the tape print medium 5 while an operator manually pulls the tape, tape printing device employing wire-dot or laser technology can also be realized within the scope of the present invention.

What is claimed is:

1. A control system for controlling a tape printing device to print an image on a tape medium within a print allowance area having a width dimension perpendicular to a length of th tape medium, comprising:
   memory means for storing data;
   print control means for controlling printing of an image corresponding to the stored data;
   examination means for examining stored data;
   determination means for determining whether the stored data examined by said examination means belongs to a preselected type of data;
   generating means for generating an instruction to print the image with a maximum size equal to the width dimension of the print allowance area when said determination means determines that stored data belongs to the preselected type of data, and for sending the instruction to said print control means to print the image; and
   a mode setting means for selecting an automatic mode for generating the instruction, wherein said generating means automatically generates the instruction to print the image in the maximum size in relation to the print allowance area width dimension when the stored data belongs to the preselected type of data.

2. The control system of claim 1, wherein said generating means automatically generates a magnification power to magnify the outline data and converts the magnified outline data to image data to send to said print control means.

3. The control system of claim 1, further comprising size input means for inputting an image size, wherein said generating means generates the instruction to print the image in the image size input from said size input means when the stored data includes data other than the preselected type of data.

4. The control system of claim 1, wherein said memory means stores data including test data comprising code data for character data and outline data contouring each character.

5. The control system of claim 4, wherein said memory means comprises a line buffer for holding text data comprising code data for character data, a text memory for holding text data from said line buffer, a size memory for holding data on printing size information for characters, a print pointer for holding the address of the code data to be printed, and a print buffer for arranging image data converted from outline data.

6. The control system of claim 4, further comprising an image generator control means for converting the outline data into image data to send to said print control means.

7. The control system of claim 6, further comprising magnification power generating means for generating a magnification power to magnify the outline data and said image generator control means converts the magnified outline data to image data to send to said print control means.

8. A tape printing device for printing an image on a tape medium having a width dimension perpendicular to a length of the tape medium comprising:
   a printer that prints characters on a tape medium;
   an input that inputs character data and commands;
   a data memory that stores character data input from said input;
   a print controller that controls said printer to print the characters based on the character data in said data memory, said print controller including a size controller that selectively controls printing size of the characters up to an entire width dimension of a print allowance area of the tape medium based on a preselected type of character data, a mode setter that selects an automatic mode for automatically controlling said size controller, and an examiner that examines whether the character data stored in said data memory belongs to the preselected group of character data when said automatic mode is set.

9. The tape printing device of claim 8, wherein said size controller controls the printing size for said printer to print the characters in a maximum size when the stored data belongs to a preselected group of character data.

10. The tape printing device of claim 8, further comprising a size input that inputs a character size, wherein said size controller controls the printing size for said printer to print the characters in the character size input from said size input when said data memory includes character data other than the preselected group of character data.

11. The tape printing device of claim 10, wherein said data memory comprises a line buffer for storing text data comprising code data for character data, a text memory for storing text data from said line buffer, a size memory for holding data on printing size information for characters based on the character size input from said size input, a print pointer for storing the address of the code data to be printed, and a print buffer for arranging image data converted from outline data.

12. The tape printing device of claim 8, wherein the preselected group of character data includes capital characters and numerals.

13. The tape printing device of claim 8, further comprising a tape width selector that selects the width of the tape medium to be printed.

14. The tape printing device of claim 8, wherein said print controller further comprises a magnification power generator that generates a magnification power to be used by said size controller to control the size of the printed character.

15. The tape printing device of claim 8, wherein said printer includes a printing head for printing characters in dot patterns and said print controller generates dot pattern data from the character data.

16. A method of printing an image on a tape medium by a tape printing device, comprising the steps of:
   imputting character data into the tape printing device;
   storing the data in a memory;
   composing text from the input data;
   sending a print command to print an image based on the composed text from the input data;
   setting the size of the characters to be printed including setting one of the actual size and an automatic size;
   examining the character data for a selected group of characters when the automatic size is set;
   generating a magnification power for generating character data in the set size;
   converting the character data into dot data; and
   sending the dot data to a printing mechanism to print the image on the tape medium.

17. The method of claim 16, wherein the steps of examining the character data and generating the magnification power are automatic.

* * * * *